United States Patent
Choi et al.

(10) Patent No.: US 7,356,235 B2
(45) Date of Patent: Apr. 8, 2008

(54) LIGHT GUIDE PLATE FOR SURFACE LIGHT-EMITTING DEVICE AND METHOD OF MANUFACTURING THE SAME

(75) Inventors: Chul Chae Choi, Bucheon-si (KR); Min Soo Noh, Yongin-si (KR); Hyun Ho Oh, Seoul (KR); Chan Ho Park, Incheon-si (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 11/159,206

(22) Filed: Jun. 23, 2005

(65) Prior Publication Data

US 2006/0002675 A1    Jan. 5, 2006

(30) Foreign Application Priority Data

Jul. 1, 2004  (KR) ............... 10-2004-0051263

(51) Int. Cl.
*G02B 6/10*  (2006.01)
(52) U.S. Cl. .............. 385/129; 385/130; 385/131; 385/132
(58) Field of Classification Search ......... 385/129–132
See application file for complete search history.

(56) References Cited

U.S. PATENT DOCUMENTS 6,950,575 B2 *  9/2005  Ingo ...................... 385/33
2004/0184737 A1 *  9/2004  Oono et al. .............. 385/52

* cited by examiner

*Primary Examiner*—Frank G. Font
*Assistant Examiner*—Jerry Martin Blevins
(74) *Attorney, Agent, or Firm*—KED & Associates, LLP

(57) ABSTRACT

A light guide plate for a surface light-emitting device and a method of manufacturing the same are disclosed wherein the light guide plate is constructed in the form of an optical waveguide including an upper cladding film, core films formed with V-cut grooves, and a lower cladding film, so that since the upper and lower cladding films with a relatively low refractive index are respectively located on upper and lower surfaces of the core films, external foreign substances cannot penetrate into the core films, and the core films are not brought into contact with other components, whereby optical transmission properties are not changed and brightness can be also enhanced, and since the V-cut grooves are formed or both the V-cut grooves and optical waveguides are formed at the same time by means of a simple hot embossing process, the manufacturing costs can be saved.

12 Claims, 7 Drawing Sheets

LIGHT GUIDE PLATE FOR SURFACE LIGHT-EMITTING DEVICE AND METHOD OF MANUFACTURING THE SAME

BACKGROUND OF THE INVENTION

1. Field of the Invention

The present invention relates to a light guide plate for a surface light-emitting device and a method of manufacturing the same, and more particularly, to a light guide plate for a surface light-emitting device and a method of manufacturing the same, wherein the light guide plate is constructed in the form of an optical waveguide including an upper cladding film, core films formed with V-cut grooves, and a lower cladding film, so that, since the upper and lower cladding films with a relatively low refractive index are respectively located on upper and lower surfaces of the core films, external foreign substances cannot penetrate into the core films to prevent from being brought into contact with other components, whereby optical transmission properties are not changed to thereby enhance the brightness.

2. Description of the Related Art

A liquid crystal display is basically constituted of a liquid crystal display panel and a backlight unit disposed at the rear of the panel.

The liquid crystal display panel serves to display an image by controlling transmitted light, and the backlight unit functions to supply the liquid crystal display panel with light.

In a backlight unit employing the lateral illumination, a light source is disposed at the side of the liquid crystal display to make the liquid crystal display device thin.

FIG. 1 is a side view schematically illustrating the structure of a general liquid crystal display. As shown in the figure, a light guide plate (11), a diffusion plate (12), a prism sheet (13) and a liquid crystal display panel (14) are sequentially disposed on a reflection plate (10). At the side of the light guide plate (11) is disposed a fluorescent lamp (15). Light exiting from the fluorescent lamp (15) is incident on the side of the light guide plate (11). The backlight unit including the reflection plate (10), the light guide plate (11), the diffusion plate (12), the prism sheet (13), and the like converts incident linear light into surface light, and allows the converted surface light to be incident on the liquid crystal display panel (14).

Functions of the respective components of the backlight unit will now be described in more detail. First, the light guide plate (11) serves to allow light from the fluorescent lamp (15) to be incident therein and then uniform surface light to be outputted on the entire upper surface.

The reflection plate (14) disposed at the rear end of the light guide plate (11) allows light from the fluorescent lamp (15) to be incident on the light guide plate (11), and the diffusion plate (12) is disposed on the light guide plate (11) to obtain uniform brightness according to a viewing angle.

Further, the prism sheet (13) serves to increase front-side brightness of light, which is transmitted and radiated upwardly from the diffusion plate (12). The prism sheet (13) allows only light with a predetermined incident angle to pass therethrough and light with the other incident angles to be totally reflected and thus returned to a lower side of the prism sheet (13). In such a case, the returned light is again reflected by the reflection plate (10) attached below the light guide plate (11).

As described above, one of the most important technical features in the field of a liquid crystal display panel is design and manufacturing technologies of a light guide plate that laterally converts incident linear light into surface light and then outputs the surface light uniformly throughout the entire surface.

FIG. 2 is a schematic cross-sectional view of a light guide plate in a surface light-emitting device according to the prior art. A surface light-emitting device such as a liquid crystal display includes a light guide plate (11), as shown in FIG. 1. Dot patterns (11a) are formed on a bottom surface of the light guide plate (11).

Light incident on the side of the light guide plate (11) is reflected on an interface of the light guide plate (11), also reflected on the dot patterns (11a) and then incident on a liquid crystal display panel.

Such a light guide plate using dot patterns is unable to diffuse light only upward. A beam pattern of light outputted from the light guide plate (11) with the dot patterns (11a) provided thereon has a spherical beam pattern (50), i.e. a beam pattern of Lambertian distribution, as shown in FIG. 3. Thus, use of a prism sheet is a must for enhancing the front brightness.

Meanwhile, a mere 50% of light outputted from the fluorescent lamp is transmitted to the liquid crystal display panel while passing through the light guide plate, the diffusion plate and the prism sheet, which results from coupling and absorption losses in the light guide plate, loss in the reflection plate, absorption and surface reflection loss in the diffusion plate, and surface reflection loss in the prism sheet.

Accordingly, as the number of components defining the backlight unit is reduced, the optical loss can be reduced enabling an overall cost reduction. There is another problem in that since an additional process of forming the dot patterns (11a) on the bottom surface of the light guide plate (11) is required in the conventional light guide plate (11), the productivity is reduced. There is a still another problem in that occurrence of defective dot patterns can reduce the yield.

SUMMARY OF THE INVENTION

The present invention is conceived to solve the aforementioned problems. The present invention provides a light guide plate for a surface light-emitting device, wherein the light guide plate is constructed in the form of an optical waveguide including an upper cladding film, core films formed with V-cut grooves, and a lower cladding film, so that, since the upper and lower cladding films with a relatively low refractive index are respectively located on upper and lower surfaces of the core films, external foreign substances cannot penetrate into the core films to prevent from being brought into contact with other components, whereby optical transmission properties are not changed to enhance the brightness.

Another object of the present invention is to provide a method of manufacturing a light guide plate for a surface light-emitting device, wherein the V-cut grooves and optical waveguides are formed using a simple hot embossing process.

A further object of the present invention is to provide a method of manufacturing a light guide plate for a surface light-emitting device, wherein the V-cut grooves and optical waveguides are formed at the same time using a simple hot embossing process to thereby reduce the manufacturing costs.

According to a first aspect of the present invention, there is provided a light guide plate for a surface light-emitting device, comprising an upper cladding film; a plurality of core films formed on a lower surface of the upper cladding film, each core film being separated from one another in the form of a stripe; and a lower cladding film so formed as to cover the lower surface of the upper cladding film and the core films, wherein a plurality of V-cut grooves are depressed from the lower cladding film up to the respective core films and separated from one another, and a metal thin film is formed on an entire lower surface of the lower cladding film or part of the lower surface of the lower cladding film where the V-cut grooves are formed.

According to a second aspect of the present invention, there is provided a light guide plate for a surface light-emitting device, comprising a first film having a first refractive index; a second film having a second refractive index and formed on a lower surface of the first film and with a plurality of grooves on the lower surface thereof; and a third film having a third refractive index and formed on the lower surface of the first film while covering the second film.

According to a third aspect of the present invention, there is provided a manufacturing method of a light guide plate for a surface light-emitting device, comprising the steps of: forming a plurality of core films on a lower surface of an upper cladding film, said core films being separably formed from one another in the form of a stripe (first step); forming a lower cladding film to cover the core films and the lower surface of the upper cladding film (second step); forming a plurality of V-cut grooves separated from one another on the respective core films and the lower cladding film below the core films by positioning a stamper with a plurality of projections on a lower surface of the lower cladding film and then pushing the stamper against the lower cladding film, said projections having a triangular pillar shape and separated from one another (third step); and forming a metal thin film on the entire lower surface of the lower cladding film or part of the lower surface where the V-cut grooves are formed (fourth step).

According to a fourth aspect of the present invention, there is provided a manufacturing method of a light guide plate for a surface light-emitting device, comprising the steps of: forming a plurality of core films on a lower surface of an upper cladding film, said core films being separably formed from one another in the form of a stripe (first step); forming a lower cladding film to cover the core films and the lower surface of the upper cladding film (second step); forming a metal thin film on a lower surface of the lower cladding film (third step); and forming a plurality of V-cut grooves separated from one another on the respective core films, and the lower cladding film and metal thin film below the core films by positioning a stamper with a plurality of projections on a lower surface of the metal thin film and then pushing the stamper against the metal thin film, wherein the projections have a triangular pillar shape and separated from one another (fourth step).

According to a fifth aspect of the present invention, there is provided a manufacturing method of a light guide plate for a surface light-emitting device, comprising the steps of: sequentially laminating a lower cladding film, core films and an upper cladding film (first step); preparing a stamper with a plurality of recesses, said recesses being separated from one another in the form of a stripe, wherein a plurality of projections having a triangular prism shape protrude from an upper surface of the recessed portion (second step); positioning the stamper in such a manner that the recessed portions and projections face a lower surface of the lower cladding film (third step); and pushing the stamper against the lower cladding film and the core films to simultaneously form a plurality of optical waveguides and a plurality of V-cut grooves (fourth step).

BRIEF DESCRIPTION OF THE DRAWINGS

The above and other objects, features and advantages of the present invention will become apparent from the following descriptions of preferred embodiments given in conjunction with the accompanying drawings, in which.

DETAILED DESCRIPTION OF THE INVENTION

Hereinafter, preferred embodiments of the present invention will be described in detail with reference to the accompanying drawings.

Figure 1:
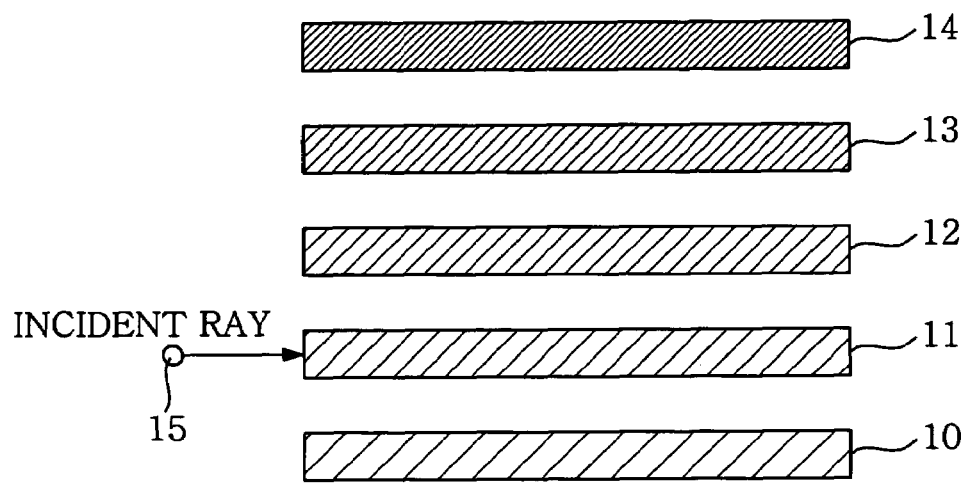
FIG. 1 is a side view schematically illustrating the structure of a general liquid crystal display.
Figure 2:
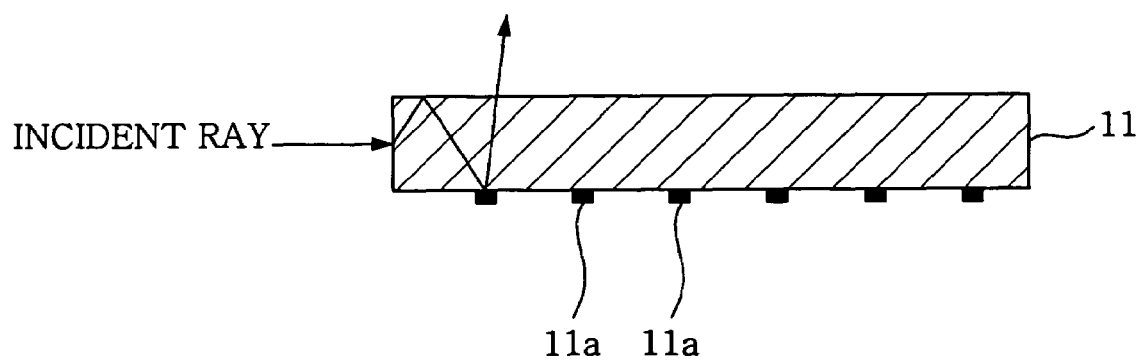
FIG. 2 is a schematic sectional view of a light guide plate in a surface light-emitting device according to the prior art.
Figure 3:
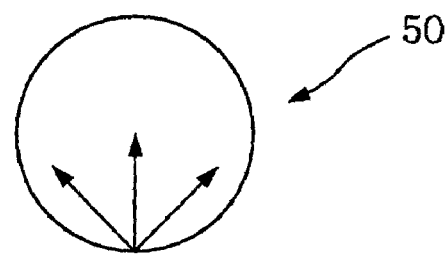
FIG. 3 is a view showing a beam pattern of light exiting from the light guide plate shown in FIG. 2.
Figure 4:
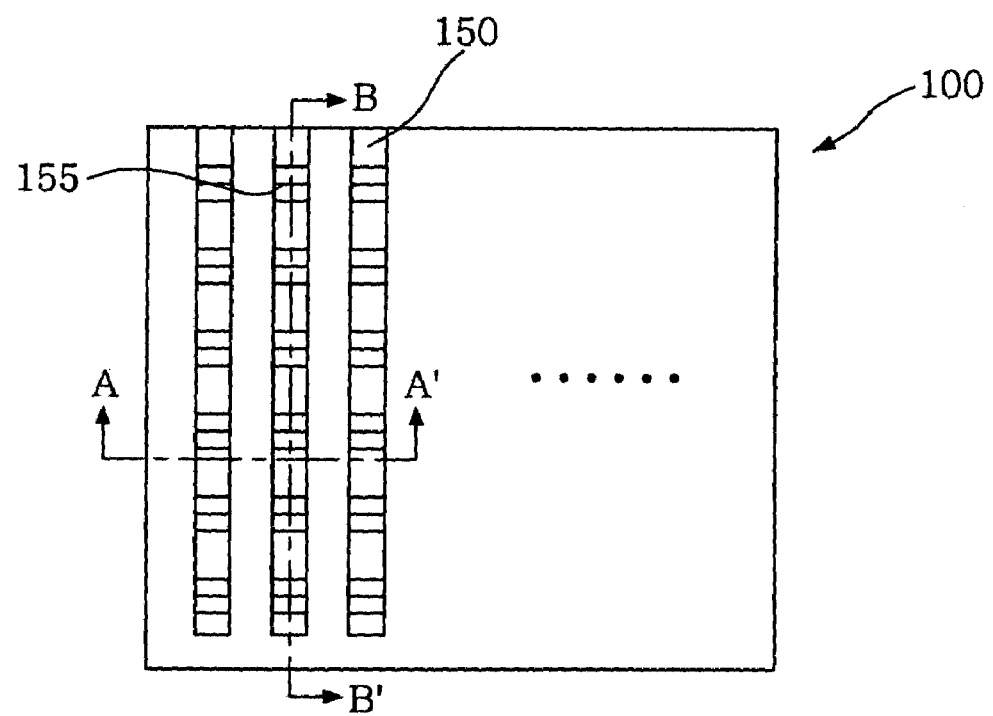
FIG. 4 is a schematic plan view of a light guide plate for a surface light-emitting device according to the present invention.

FIG. 4 is a schematic plan view of a light guide plate for a surface light-emitting device according to the present invention. Referring to FIG. 4, a light guide plate (100) includes a plurality of optical waveguides (150), which are covered by an upper cladding film and a lower cladding film, protrudes upwardly from the upper cladding film and are separated from each other. A plurality of V-cut grooves (155) are formed on each of the optical waveguides (150).

Figure 5:
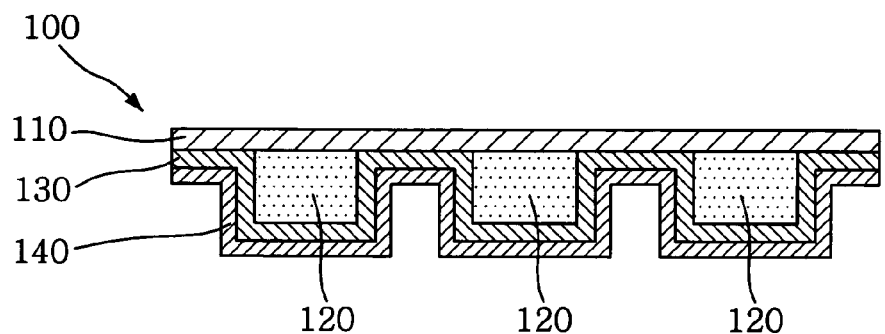
FIG. 5 is a sectional view of the light guide plate taken along line A-A' in FIG. 4.

FIG. 5 is a sectional view of the light guide plate taken along line A-A' in FIG. 4. When viewed from a cross-section taken along line A-A' in FIG. 4, the light guide plate (100) includes an upper cladding film (100), a plurality of core films (120) separately formed on a lower surface of the upper cladding film (110) in the form of a stripe, a lower cladding film (130) so formed as to cover the lower surface of the upper cladding film (110) and the core films (120), and a metal thin film (140) formed on a lower surface of the lower cladding film (130).

Preferably, the metal thin film (140) is a silver (Ag) thin film or an aluminum (Al) thin film.

Further, the upper cladding film (110), the lower cladding film (130) and the core films (120) are made of polymer material. A refractive index of the core film (120) is higher than that of the upper or lower cladding film (110. 130), allowing the core film (120) to function as an optical waveguide.

Preferably, thickness of the upper cladding film (110) is 10 μm to 5 μm, and thickness of each core film (120) is 50 μm to 1 mm. More preferably, the lower cladding film (130) is 1 μm to 100 μm in thickness.

Figure 6:
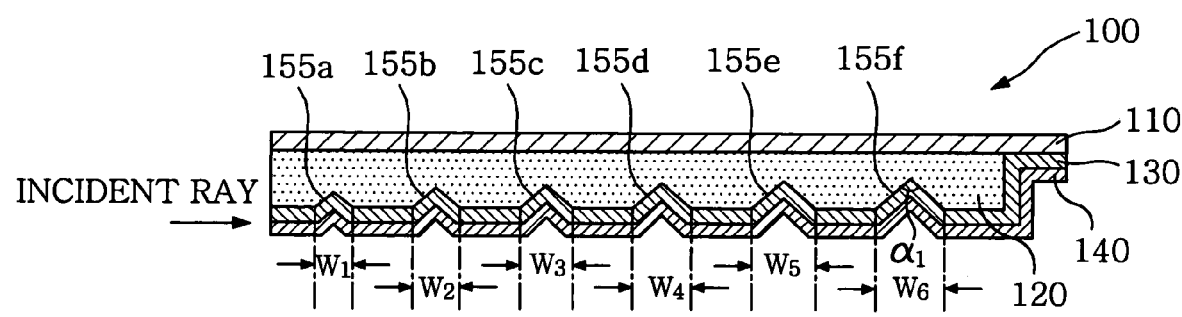
FIG. 6 is a sectional view of the light guide plate taken along line B-B' in FIG. 4.

FIG. 6 is a sectional view of the light guide plate taken along line B-B' in FIG. 4. When viewed from a cross-section taken along line B-B' in FIG. 4, a plurality of V-cut grooves (155a. 155b. 155c. 155d. 155e. 155f), each spaced apart at a predetermined distance, are formed on the core film (120) of the light guide plate (100).

Preferably, in order to allow the incident light to be vertically radiated uniformly throughout the entire surface, the V-cut grooves (155a. 155b. 155c. 155d. 155e.155f) respectively have widths (W1. W2. W3. W4. W5. W6), the width becoming wider as they are farther distanced from the side surface of the plurality of the core films (120) on which the light is incident. The widths of the grooves are in reverse proportion to the intensity of light transmitted to the V-cut grooves.

In other words, if light is incident on the side surface of the light guide plate (100), it is transmitted along the core film (120), i.e. the optical waveguide. The transmitted light is vertically radiated from the plurality of the V-cut grooves.

However, an angle ($\alpha 1$) of the V-cut groove (155a. 155b. 155c. 155d. 155e. 155f) is preferably 60 to 120 degrees.

Figure 7A:
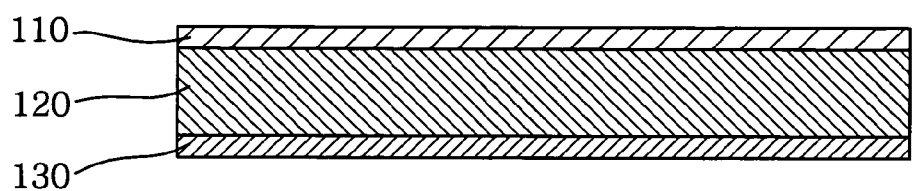
FIGS. 7a to 7c are sectional views of a core region for illustrating a process of manufacturing a light guide plate for a surface light-emitting device according to the present invention.
Figure 7B:
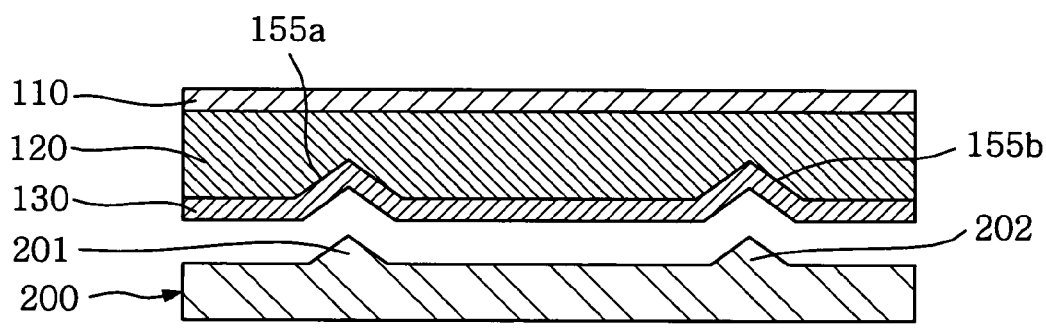
Figure 7C:
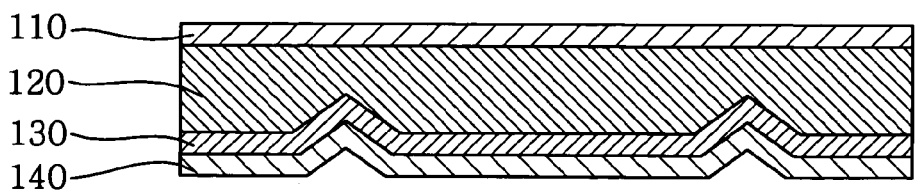

FIGS. 7a to 7c are sectional views of a core region for illustrating a process of manufacturing a light guide plate for a surface light-emitting device according to the present invention. Referring again to FIGS. 4 to 6, a plurality of core films (120) separated from one another are formed on the lower surface of the upper cladding film (110) in the form of a stripe. The lower cladding film (130) encompasses the lower surface of the upper cladding film (110) and the core films (120). (see FIG. 7a)

Successively, a stamper (200) in which a plurality of triangular projections (201. 202) separated from one another are formed is positioned under the lower cladding film (130). The projections (201. 202) of the stamper (200) are pushed against the lower cladding film (130) such that the plurality of V-cut grooves (155a. 155b) separated from one another are respectively formed on the core film (120) and the lower cladding film (130) below the core film (120). (see FIG. 7b)

A metal thin film (140) is then formed on the entire lower surface of the lower cladding film (130) or surfaces of the V-cut grooves (155a. 155b). (see FIG. 7c)

Figure 8A:
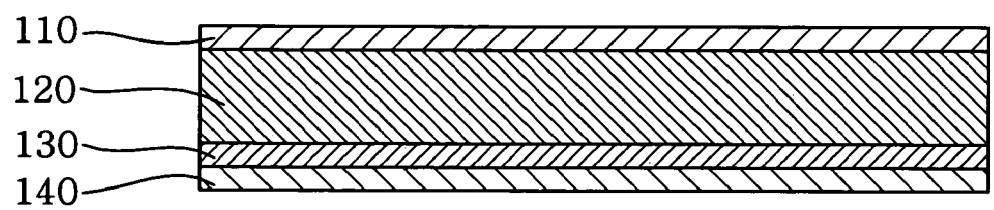
FIGS. 8a and 8b are sectional views of a core region for illustrating another process of manufacturing a light guide plate for a surface light-emitting device according to the present invention.
Figure 8B:
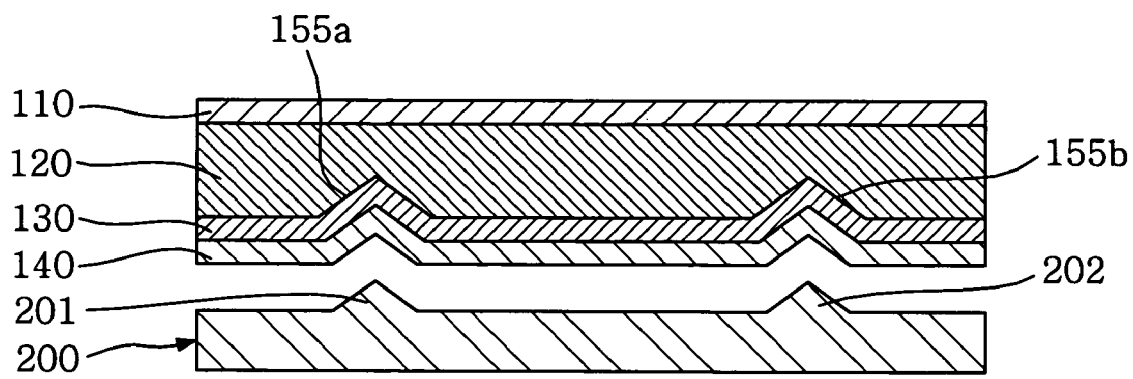

FIGS. 8a and 8b are sectional views of a core region for illustrating another process of manufacturing a light guide plate for a surface light-emitting device according to the present invention. Referring back to FIG. 7a, the plurality of core films (120), each film spaced apart at a certain distance, are formed on the lower surface of the upper cladding film (110) in the form of a stripe, and the lower cladding film (130) covers the lower surface of the upper cladding film (110) and the core films (120). A metal thin film (140) is then formed on the lower surface of the lower cladding film (130). (see FIG. 8a)

The upper and lower cladding films (110. 130) are made of a material whose glass transition temperature is higher by 1° C. to 30° C. than that of a material of the core films (120).

Thereafter, the stamper (200) on which the plurality of triangular projections (201. 202), each being separated from one another, are formed is positioned under the metal thin_film (140). The projections (201. 202) of the stamper (200) are pushed against the metal thin film (140) such that the plurality of V-cut grooves (155a. 155b) separated from one another are formed on the core film (120), the lower cladding film (130) underneath the core films (120), and the metal thin film (140). (see FIG. 8b)

The method of forming the V-cut grooves (155a. 155b) using the stamper (200) a hot embossing process where heat is applied to the stamper and a material of the light guide plate and the stamper is pushed toward the light guide in order to form a predetermined shape onto a light guide plate film. If the material of the light guide plate and the stamper are heated to a temperature higher than a glass transition temperature of the lower cladding film and the stamper is then pushed toward the lower cladding film, a shape complementary to the shape of the stamper is formed on the light guide plate film. In other words, recesses corresponding to triangular projections are formed on the light guide plate film.

Figure 9:
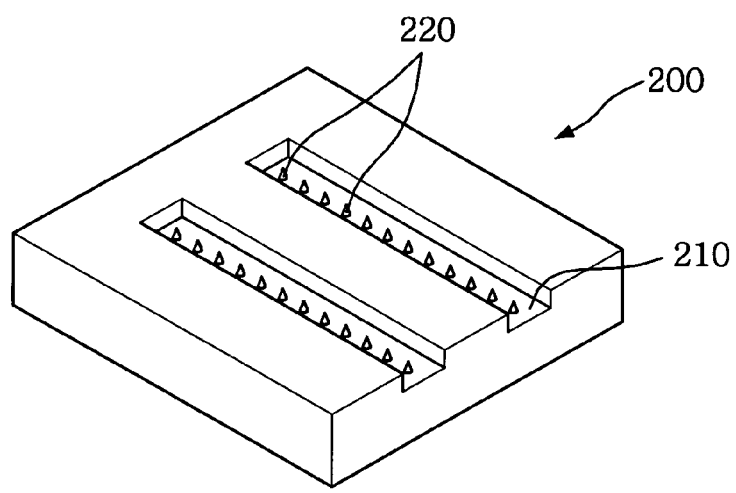
FIG. 9 is a schematic perspective view of a stamper for illustrating a further process of manufacturing a light guide plate for a surface light-emitting device according to the present invention.

The manufacturing process of a light guide plate for a surface light-emitting device according to the present invention further comprises the steps of: sequentially forming a lower cladding film, core films and an upper cladding film; preparing a stamper (200) on which a plurality of recessed portions (210) separated from one another are formed in the form of a stripe as shown in FIG. 9 and a plurality of projections (220) rise upwardly from upper surfaces of the recessed portions (210) each in the form of a triangular pillar; positioning the stamper (200) in such a manner that the recessed portions (210) and projections (220) of the stamper face a lower surface of the lower cladding film; and causing the stamper (200) to be pushed against the lower cladding film and core film to thereby simultaneously form a plurality of optical waveguides and a plurality of V-cut grooves, each being distanced at a certain distance.

Here, regions made by the recessed portions (210) of the stamper (200) correspond to_regions that are not compressed by the projections, in which optical waveguides separated from one another are respectively formed in the form of a stripe. The plurality of the V-cut grooves are formed on the optical waveguides that are compressed by the projections (220).

Alternatively, a metal thin film can be further formed on a lower surface of the lower cladding film, and the stamper can be pushed against the metal thin film, lower cladding film and core films such that the plurality of optical waveguides and the plurality of V-cut grooves, which are separated from one another, can be simultaneously formed.

Figure 10:
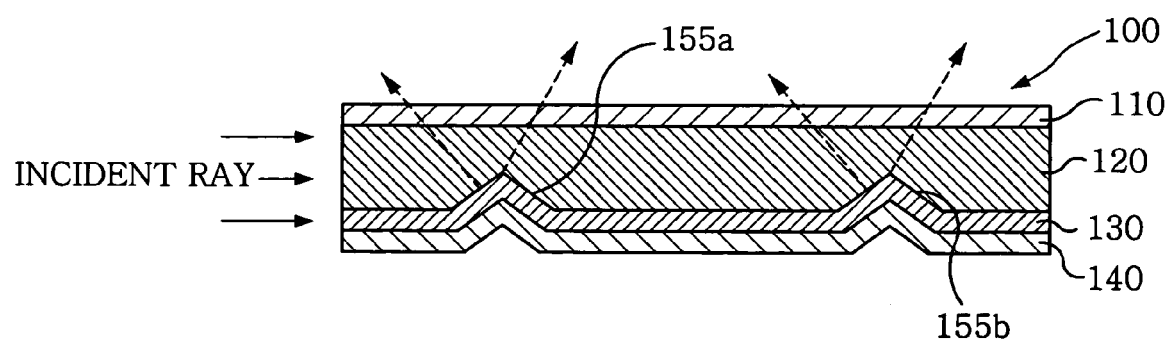
FIG. 10 is a view showing a beam pattern of light passing through the light guide plate for the surface light-emitting device according to the present invention.

FIG. 10 is a schematic drawing view showing a pattern of light passing through the light guide plate for the surface light-emitting device according to the present invention. Light incident on the side surface of the light guide plate (100) from a fluorescent lamp propagates only through the core films (120) while it is totally reflected therein.

The light thus propagated is partially reflected and vertically radiated by the V-cut grooves (155a). Furthermore, incident light that has not been totally reflected by the first V-cut grooves (155a) is reflected by the metal thin film (140) coated on the lower cladding film (130) and then vertically upwardly radiated.

Still furthermore, light that has not been reflected by the first V-cut grooves (155a) is vertically radiated by means of second V-cut grooves (155b) in the same manner as that of the first V-cut grooves.

Figure 11:
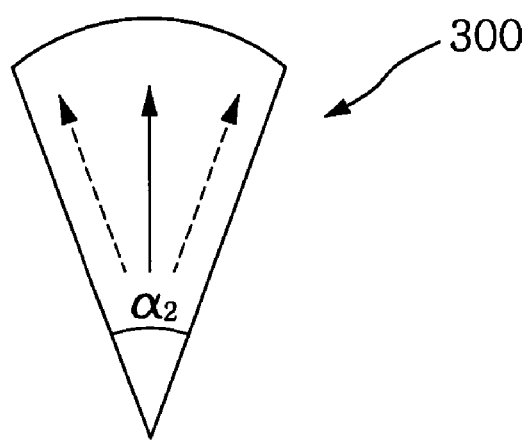
FIG. 11 is a view showing a beam pattern of light exiting from the light guide plate according to the present invention.

A pattern of light reflected by the V-cut grooves (155a. 155b) and then radiated from the light guide plate (100) comes to form a conical beam pattern (300) with a radiation angle ($\alpha 2$) as shown in FIG. 11.

In such a case, if a difference in a refractive index between the upper and lower cladding films (110. 130) and the core films (120) is large, the radiation angle (α2) becomes greater. If the difference in the refractive index is small, the radiation angle (α2) becomes smaller.

A radiation angle of a beam radiated from the light guide plate is smaller than that of the conventional light guide plate or diffusion plate. Therefore, there is no need of employing a prism sheet used to increase the front brightness as in the conventional backlight unit.

Further, since a plurality of optical waveguides are aligned in the form of a stripe in one dimension, light can be radiated uniformly from the entire surface of a display panel, when viewed from the top of the light guide plate.

Furthermore, the aforementioned metal thin film can upwardly radiate even the light that is not totally reflected by the V-cut grooves. In addition, the metal thin film regions outside the V-cut groove regions can also reflect light, which has been reflected toward the bottom of the light guide plate, again reflect the light toward the top of the light guide plate, thereby increasing the amount of light incident on the liquid crystal display panel.

Therefore, since a metal thin film serving as a reflection plate is formed simultaneously when a light guide plate is fabricated, there is no need for an additional reflection plate.

Moreover, due to such a constitution thus described, there is an advantage in that since a conical beam with a low radiation angle is radiated from the light guide plate, the V-cut grooves formed in the optical waveguides can also function as the prism sheet and the front brightness can be enhanced without recourse to an additional prism sheet.

As apparent from the foregoing, the present invention embodies a light guide plate for a surface light-emitting device, the plate comprising: a first film with a first refractive index; a second film with a second refractive index, which is formed on a lower surface of the first film and has a plurality of grooves formed on a lower surface thereof; and a third film with a third refractive index, which is formed on the lower surface of the first film while covering the second film.

Preferably, the second refractive index is greater than the first and third refractive indices, and each groove is provided with a reflection surface from which light incident from the side surface of the second film can be reflected upwardly toward an upper surface of the first film.

More preferably, the second film is plurally formed on a lower surface of the first film, each film being separated therebetween in the form of a stripe, and reflection means is also formed on a lower surface of the third film.

As described above, according to the present invention, a light guide plate is constructed in the form of an optical waveguide having an upper cladding film, a core film formed with V-cut grooves, and a lower cladding film. Therefore, since the upper and lower cladding films with a relatively low refractive index are respectively located on upper and lower surfaces of the core film, external foreign substances cannot penetrate the core film, nor is the core film brought into contact with other components. Accordingly, there is an advantage in that optical transmission properties remain unchanged to simultaneously enhance the brightness.

Further, since the V-cut grooves are formed or both the V-cut grooves and optical waveguides are formed at the same time by means of a simple hot embossing process, there is another advantage in that the manufacturing costs can be saved.

Although the present invention has been described and illustrated in connection with the preferred embodiments of the present invention, it is not limited thereto. It will be apparent to those skilled in the art that various modifications and changes may be made thereto without departing from the technical scope and spirit of the invention. Therefore, the true scope of the present invention should be defined by the technical spirit of the appended claims.

What is claimed is:

1. A light guide plate for a surface light-emitting device, comprising:
    an upper cladding film;
    a plurality of core films formed on a lower surface of the upper cladding film, each core film being separated from one another in the form of a stripe; and
    a lower cladding film formed to cover the lower surface of the upper cladding film and the core films, wherein a plurality of V-cut grooves are depressed from the lower cladding film up to the respective core films and separated from one another, and a metal thin film is formed on an entire lower surface of the lower cladding film or part of the lower surface of the lower cladding film where the V-cut grooves are formed, and wherein widths of the V-cut grooves become larger as the V-cut grooves become farther away from a side surface of the plurality of core films on which light is incident.

2. The light guide plate as claimed in claim 1, wherein the metal thin film is a silver (Ag) thin film or aluminum (Al) thin film.

3. The light guide plate as claimed in claim 1, wherein an angle (α1) of the V-cut grooves is within a range of 60 to 120 degrees.

4. The light guide plate as claimed in claim 1, wherein an angle (α1) of the V-cut grooves is within a range of 60 to 120 degrees.

5. The light guide plate as claimed in claim 1, wherein a thickness of the upper cladding film is 10 μm to 5 mm, a thickness of the core film is 50 μm to 1 mm, and a thickness of the lower cladding film is 1 μm to 100 μm.

6. The light guide plate as claimed in claim 1, wherein a refractive index of the core film is greater than those of the upper and the lower cladding films.

7. The light guide plate as claimed in claim 1, wherein the partial or entire surface of the lower cladding film is disposed between the metal film and the core films.

8. The light guide plate as claimed in claim 7, wherein the metal film does not contact the core films.

9. A light guide plate for a surface light-emitting device, comprising:
    an upper cladding film;
    a plurality of core films formed on a lower surface of the upper cladding film, each core film being separated from one another in the form of a stripe; and
    a lower cladding film formed to cover the lower surface of the upper cladding film and the core films, wherein a plurality of V-cut grooves are depressed from the lower cladding film up to the respective core films and separated from one another, and a metal thin film is formed on an entire lower surface of the lower cladding film or part of the lower surface of the lower cladding film where the V-cut grooves are formed,
    wherein each V-cut groove receives light traveling in a first direction and reflects said light in a second direction, and wherein the first direction is substantially parallel to the lower surface of the upper cladding film and the second direction crosses at least the lower surface of the upper cladding film.

10. The light guide plate as claimed in claim 1, wherein each core film includes multiple V-cut grooves that reflect light received from a same end of the core film, said multiple V-cut grooves located between the upper and lower cladding films.

11. A light guide plate for a surface light-emitting device, comprising:
- an upper cladding film;
- a plurality of core films formed on a lower surface of the upper cladding film, each core film being separated from one another in the form of a stripe; and
- a lower cladding film formed to cover the lower surface of the upper cladding film and the core films, wherein a plurality of V-cut grooves are depressed from the lower cladding film up to the respective core films and separated from one another, and a metal thin film is formed on an entire lower surface of the lower cladding film or part of the lower surface of the lower cladding film where the V-cut grooves are formed,
- wherein each core film includes multiple V-cut grooves that reflect light received from a same end of the core film, said multiple V-cut grooves located between the upper and lower cladding films, and wherein said end is formed in a direction different from the lower surface of the upper cladding film.

12. A light guide plate for a surface light-emitting device, comprising:
- an upper cladding film;
- a plurality of core films formed on a lower surface of the upper cladding film, each core film being separated from one another in the form of a stripe; and
- a lower cladding film formed to cover the lower surface of the upper cladding film and the core films, wherein a plurality of V-cut grooves are depressed from the lower cladding film up to the respective core films and separated from one another, and a metal thin film is formed on an entire lower surface of the lower cladding film or part of the lower surface of the lower cladding film where the V-cut grooves are formed, wherein said multiple V-cut grooves are of different sizes.

* * * * *